US012380435B2

(12) United States Patent
Libell et al.

(10) Patent No.: US 12,380,435 B2
(45) Date of Patent: Aug. 5, 2025

(54) DETECTION OF USE OF A REMOTE ACCESS TOOL FOR SECURE TRANSACTIONS

(71) Applicant: BehavioSec Inc, San Francisco, CA (US)

(72) Inventors: Tony Libell, Luleå (SE); Per Burström, Luleå (SE); Mikael Åhlén, Västerås (SE)

(73) Assignee: LEXISNEXIS RISK SOLUTIONS FL INC., Alpharetta, GA (US)

( * ) Notice: Subject to any disclaimer, the term of this patent is extended or adjusted under 35 U.S.C. 154(b) by 433 days.

(21) Appl. No.: 17/876,822

(22) Filed: Jul. 29, 2022

(65) Prior Publication Data

US 2024/0037541 A1 Feb. 1, 2024

(51) Int. Cl.
*G06Q 20/38* (2012.01)
*H04L 47/10* (2022.01)
*H04L 67/125* (2022.01)

(52) U.S. Cl.
CPC .......... *G06Q 20/382* (2013.01); *H04L 47/10* (2013.01); *H04L 67/125* (2013.01)

(58) Field of Classification Search
None
See application file for complete search history.

(56) References Cited

U.S. PATENT DOCUMENTS

| | | | | |
|---|---|---|---|---|
| 9,516,035 B1* | 12/2016 | Moritz | ................ | G06F 21/602 |
| 2006/0282660 A1* | 12/2006 | Varghese | ............. | G07F 7/1083 |
| | | | | 713/155 |
| 2015/0156214 A1* | 6/2015 | Kaminsky | ............. | G06F 21/552 |
| | | | | 726/22 |
| 2015/0363785 A1* | 12/2015 | Perez | ..................... | G06Q 20/20 |
| | | | | 705/44 |
| 2017/0054702 A1* | 2/2017 | Turgeman | ............... | G06F 21/31 |
| 2020/0273040 A1* | 8/2020 | Novick | ............. | G06Q 20/4016 |
| 2022/0159025 A1* | 5/2022 | Niv | ........................ | G06N 20/00 |
| 2023/0229765 A1* | 7/2023 | Saadon | ................. | G06F 21/552 |
| | | | | 726/23 |

OTHER PUBLICATIONS

Rui Xu, Donald Wunsch II; Survey of Clustering Algorithms; EEE Transactions on Neural Networks, May 2005; vol. 16, No. 3; 34 pages.

(Continued)

*Primary Examiner* — Jamie R Kucab
(74) *Attorney, Agent, or Firm* — TROUTMAN PEPPER LOCKE LLP; James E. Schutz; Mark Lehi Jones

(57) ABSTRACT

A method for determining whether a secure transaction between a user computing device and a server, connected via a network, is controlled remotely via a remote access tool. The method includes, during the secure transaction, actively perturbing and/or probing the network to change the conditions in the network. During perturbing of the network, data relating to user interactions with a user interface associated with the user computing device is collected and compared to reference data relating to user interactions carried out prior to the secure transaction or prior to perturbing of the network. Based on the comparison, a probability that the secure transaction is carried out via a remote access tool is computed and is compared to a predefined threshold. If the threshold is exceeded, the secure transaction is terminated.

24 Claims, 7 Drawing Sheets

(56) References Cited

OTHER PUBLICATIONS

Liu Yang; Distance Metric Learning: A Comprehensive Survey; Department of Computer Science and Engineering Michigan State University; May 19, 2006; 51 pages.

Anupama Mishra, B.B. Gupta; Dragan Perakovic, Francisco Jose Garcia-Penalvo; A Survey on Data mining classification approaches; Swami Rama Himalayan University, India, National Institute of Technology, Kurukshetra, Haryana 136119, India & Asia University, Taichung 413, Taiwan & Staffordshire University, Stoke-on-Trent ST4 2DE, UK, University of Zagreb, Croatia, University of Salamanca, Spain; Dec. 2021; 9 pages.

* cited by examiner

DETECTION OF USE OF A REMOTE ACCESS TOOL FOR SECURE TRANSACTIONS

FIELD OF THE DISCLOSED TECHNOLOGY

The disclosed technology relates generally to the authentication of users for secure transactions, and, more specifically, to a method and a system for detection of fraud by the use of a remote access tool to carry out transactions on a target's computing device.

BACKGROUND

Electronic devices are used by millions of people to perform many types of operations, such as communicating with other people (e.g., by email, instant messaging, phone calls, and video chats), capturing memories (e.g., taking pictures, videos, and voice recordings), entertainment (e.g., listening to music, watching videos, playing games), financial transactions (e.g., access to bank accounts, transferring funds, shopping) and the like.

Some of the more sensitive transactions that may be carried out using electronic devices, such as transactions requiring the transfer of funds (e.g., shopping, bank account transactions, and the like), require authentication of the user to ensure that the user carrying out the transaction is indeed the human authorized to do so.

Remote access tools, such as TeamViewer, AnyDesk, Splashtop Business Access, Zoho Assist, etc., may enable a user at a first location to access a desktop of a computer at a second, remote location, and to use that desktop as if they were at the second location. Such tools are very useful in allowing IT (Information Technology) personnel to service a user's computer, allowing teams to work cooperatively, etc. However, remote access tools may also be used by fraudsters to impersonate the authorized user and carry out secure transactions from the authorized user's device.

There is thus a need in the art for a system and method for detecting when a secure transaction is carried out using a remote access tool, to ensure that the secure transaction is not fraudulent.

SUMMARY OF THE DISCLOSED TECHNOLOGY

The disclosed technology relates generally to the authentication of users for secure transactions, and, more specifically, to a method and a system for detection of fraud carried out by use of a remote access tool to carry out a secure transaction on a target's computing device.

According to an aspect of some embodiments of the teachings herein, there is provided a method for determining whether a secure transaction between a user computing device and a server, connected via a network, is controlled remotely from a second computing device via a remote access tool. The method includes collecting and comparing user interaction data before and during active perturbation of the network to detect certain indications of remote control. In certain exemplary implementations, the network may be actively perturbed (for example, during a secure transaction) to change the conditions in the network. The method further includes, during perturbing of the network, collecting data relating to user interactions with a user interface associated with the user computing device, and comparing the collected data to reference data relating to user interactions carried out prior to the secure transaction or prior to perturbing and/or probing of the network. Based on the comparison, a probability that the secure transaction is carried out via a remote access tool is computed. The probability is compared to a predefined threshold, and if it exceeds the predefined threshold, it is concluded that the secure transaction is being carried out via the remote access tool, and the secure transaction is terminated.

In some embodiments, actively perturbing includes increasing the load on the network. In some embodiments, actively perturbing includes throttling the network. In some embodiments, actively perturbing includes increasing the percentage of packet loss in the network. In some embodiments, the actively perturbing includes increasing delays of communications within the network.

In some embodiments, determining the probability that the secure transaction is being carried out via a remote access tool may be based on timing distributions of input data related to the user interactions. In some embodiments, determining the probability may be based on an amount of time between timing samples or events.

In some embodiments, actively perturbing can be carried out only when the user is actively interacting with the server.

In some embodiments, the method further includes, prior to or after the secure transaction, collecting additional data relating to user interactions with a user interface associated with the user computing device during user interaction with the network under standard network conditions. The additional data may be used as part of the reference data and may be utilized during the comparison.

In some embodiments, the method further includes, prior to comparing, identifying at least one data distribution pattern which typically stems from the use of at least one remote access tool. During the comparison, at least one data distribution pattern may be used as part of the reference data.

In some embodiments, perturbing and/or probing of the network includes perturbing and/or probing of a specific port, which specific port is previously identified as being used during the secure transaction.

According to an aspect of some embodiments of the teachings herein, there is provided a device for determining whether a secure transaction between a user computing device and a server, connected via a network, is controlled remotely from a second computing device via a remote access tool. The device includes a storage element configured for storing reference data relating to events occurring prior to the secure transaction. The device includes a network interface connected to the network between the user computing device and the server. The device further includes a processor, functionally associated with the storage element, and the network interface. The processor may be adapted to change conditions in the network during the secure transaction and may be further adapted to collect data relating to user interactions with a user interface associated with the user computing device while the conditions of the network are changed. The processor may be further adapted to compare the data collected (while the conditions of the network are changed) to the reference data and to determine, based on the comparison, the probability that the secure transaction is carried out via a remote access tool. Upon identifying that the probability exceeds a predefined threshold, the processor may be adapted to conclude that the secure transaction was or is being carried out via the remote access tool, and the secure transaction may be terminated.

In some embodiments, the processor may change the conditions by increasing the load on the network or by throttling the network. In some embodiments, the processor may change the conditions by increasing the percentage of packet loss in the network. In some implementations, increasing the packet loss may be done by intentionally creating link congestion, suppressing packet reception acknowledgments, clearing temporary buffers, etc. In some embodiments, the processor may change the conditions by intentionally increasing delays of communications within the network.

In some embodiments, the processor may determine the probability that a transaction is carried out via a remote access tool based on timing distributions of input data related to user interactions. In some embodiments, the processor may determine the probability based on time differences ($\Delta t$) between timing samples or events.

In some embodiments, the processor may change the conditions only when the user is actively interacting with the server.

In some embodiments, the processor may be further adapted to collect additional data relating to user interactions with a user interface associated with the user computing device during standard network conditions and to store the additional data as part of the reference data.

In some embodiments, the processor may be further adapted to identify at least one data distribution pattern which typically stems from the use of at least one remote access tool, and to store at least one data distribution pattern as part of the reference data.

In some embodiments, the processor may change the conditions of a specific port, which specific port is previously identified as being used during the secure transaction.

In the context of the present specification and claims, the terms "substantially" and "approximately" are defined as being within 10% of a target number or measure. It should be understood that the use of "and/or" is defined inclusively such that the term "a and/or b" should be read to include the sets: "a and b," "a or b," "a," "b."

A better understanding of the disclosed technology will be obtained from the following detailed description of the preferred embodiments taken in conjunction with the drawings and the attached claims.

DETAILED DESCRIPTION

In various embodiments of the disclosed technology, user interaction data may be collected during a secure transaction, such as a banking transaction. The collected user interaction data may be clustered and/or categorized, for example using statistical measures, to create a user profile for a transaction carried out from the authorized user's device.

At some later stage, during another secure transaction, the network connection used for the transaction may be actively perturbed, for example by varying the network load, the packet loss, and/or the delay in the network. User interaction data may then be collected again during the perturbing and may be compared to the user profile and/or to previously collected data, to measure similarities/dissimilarities therebetween. In certain exemplary implementations, a similarity metric may be determined based on the comparison. If the similarity metric indicates certain differences between the perturbed and unperturbed interaction data and/or events, such differences may be indicative that a transaction is being carried out from a remote location (e.g., by a fraudster) via a remote access tool, and not directly from the authorized user's device.

Certain embodiments of the disclosed technology will become clearer in view of the following description of the drawings.

Figure 1:
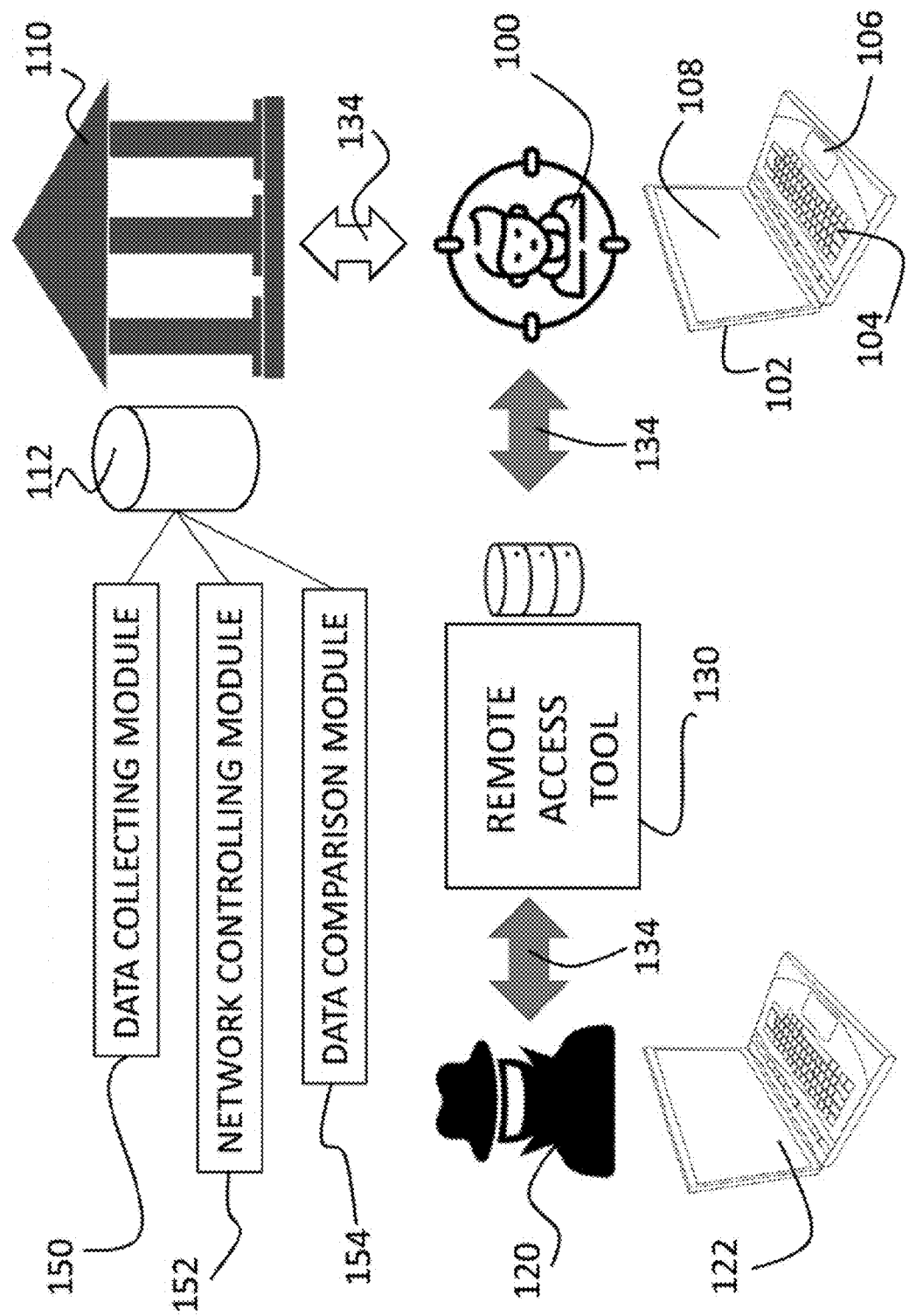
FIG. 1 is an example block diagram of a system for detecting fraud carried out using remote access tools, according to an embodiment of the teachings herein

Reference is now made to FIG. 1, which is a block diagram of a system for detecting fraud carried out using remote access tools, according to an embodiment of the teachings herein.

As illustrated in FIG. 1, a user 100 may operate a first computing device 102 associated with the user 100 to carry out a secure transaction with a secure server 112 of a bank 110 or another high-sensitivity establishment. During the transaction, the user 100 may interact with user interface components of the computing device 102, such as a keyboard 104, a touchpad or mouse 106, and/or a screen 108. Such interactions may generate user interaction data that can be analyzed to determine if a remote access tool is being used in the transaction(s), as will be discussed below with reference to FIGS. 3A-3C.

In some cases, the first computing device 102 may be remotely controlled by a second user 120 using a second computing device 122 via a network-based remote access tool 130. The computing devices 102, 112, and 122 are typically connected via one or more networks, indicated by arrows 134. The remote access tool 130 for example, may operate certain protocols, which may include, but are not limited to commercial products such as TeamViewer™, AnyDesk™, Splashtop™, Zoho™, etc. However, in lieu of discussing such commercially available tools, two generically-named remote access protocols—"Remote Protocol A" and "Remote Protocol B"—are discussed herein and utilized to provide examples of the types of different data communication behaviors that these remote access protocols can exhibit when under normal network conditions and when the network is throttled, overloaded, etc., (herein collectively denoted as "perturbed"). Certain exemplary implementations of the disclosed technology may evaluate normal vs. perturbed communication behavior to determine if a remote access tool is being used.

In certain exemplary implementations, without a detailed analysis of the perturbed vs. unperturbed network data, a fraudulent transaction may appear as if it were coming from the first computing device 102 and not from the second computing device 122. The system of FIG. 1 may be designed for detecting whether a second device 122 (perhaps operated by a fraudulent second user 120) is being utilized to carry out the secure transaction in place of the first computing device 102 used by the legitimate user 100.

According to an exemplary implementation of the disclosed technology, a data collecting module 150, which may be a software module executed by a processor as described hereinbelow, may run on the secure server 112 or on the user's computing device 102 and may be adapted to collect data relating to the user's interaction with the device 102, such as data relating to mouse movements, keystroke dynamics, touchscreen motions or gestures, swipes, clicks, and the like. The data collecting module 150 may be functionally associated with a suitable database, which may form part of the user's computing device 102 or the server 112.

The collected interaction data may include data relating to touch gestures, such as angle of swipe, acceleration of swipe, the velocity of swipe, time of flight, dominant side, area of swipe, curve fitting, a heat map of swipe, distance of swipe, etc. The collected interaction data may include data relating to keyboard actions, such as a keystroke pattern, a keystroke style, keystroke dwell, keystroke speed, keystroke flight time, etc. In accordance with certain exemplary implementations of the disclosed technology, the collected interaction data can include timing data associated with the various interactions. In accordance with certain exemplary implementations of the disclosed technology, variations in the timing data corresponding to periods when the network is perturbed may be compared with similar timing data when the network is unperturbed to detect the use of the remote access tool 130 in the transaction.

In certain exemplary implementations, a network load controlling module 152, which may be a software module executed by a processor as described hereinbelow, may run on the secure server 112 or on the user's computing device 102 and may be adapted to throttle the network 134 during a secure transaction, or at specific times during a secure transaction. For example, the network controlling module 152 may include a load controlling module that may change the network load by changing the bandwidth available for the transaction and/or by increasing packet loss during the transaction. In certain exemplary implementations, the data collecting module 150 may be adapted to collect the user interaction data during the time in which the network is throttled/perturbed to provide an indication as to whether or not a remote access tool 130 is being used.

The interaction data collected while perturbing the network, as well as previously collected interaction data (or a user profile constructed based on such previously collected interaction data) may be transmitted to a data comparison module 154. The data comparison module 154 may be a software module executed by a processor as described herein below and may run on the secure server 112 or the user's computing device 102. The data comparison module 154 may compare the collected interaction data to previously collected interaction data, or to the user profile storing interaction data for the user 100 when using computing device 102, and the data comparison module 154 may determine a similarity therebetween. This may be accomplished using timing distributions, distance metrics, statistical algorithms, clustering algorithms, and/or classification algorithms, for example. Based on the comparison, a probability may be determined to indicate whether the transaction is being carried out by a remote access tool 130, which may be indicative of a fraudulent second user 120 carrying out the transaction using a second computing device 122.

Figure 2:
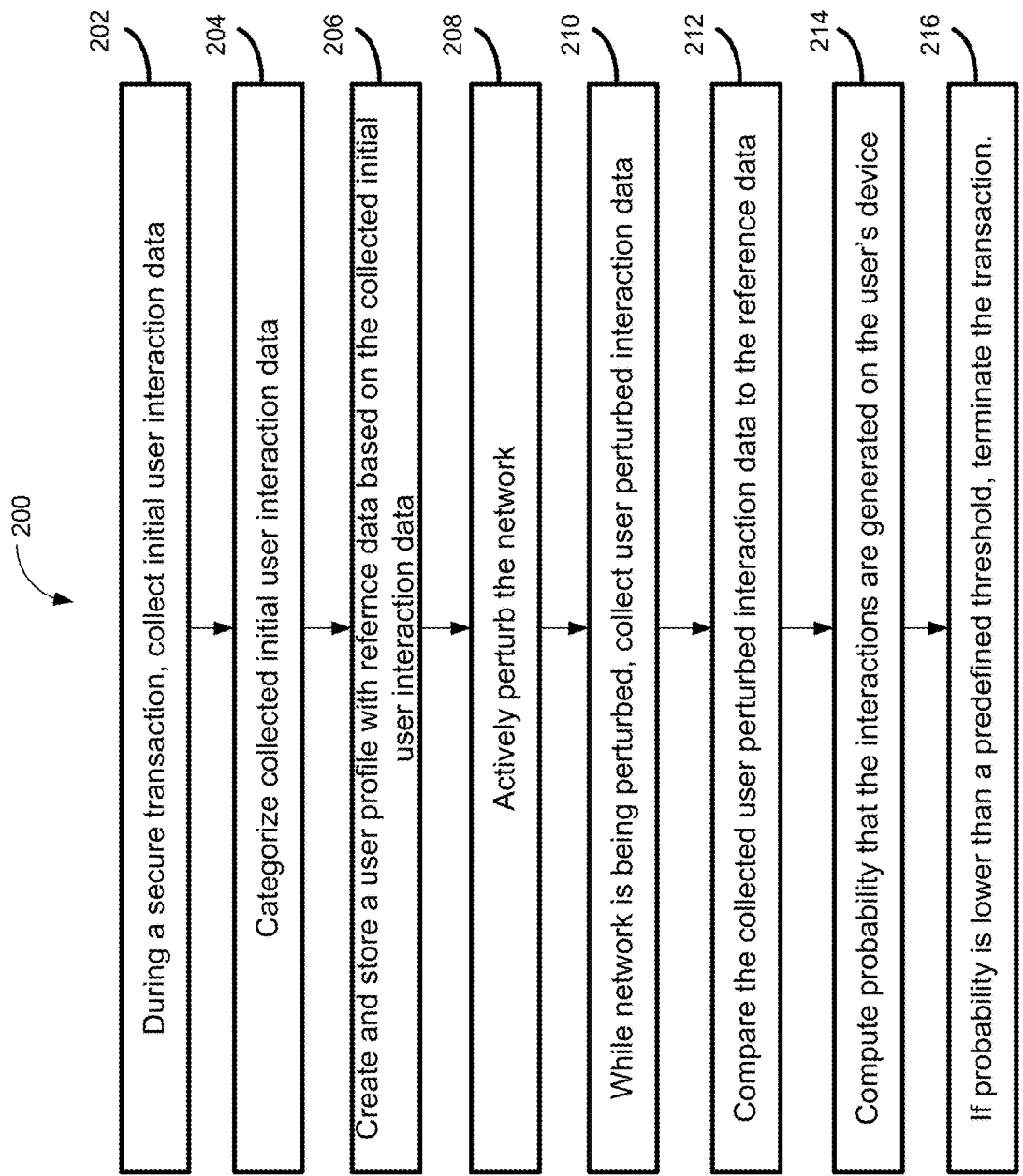
FIG. 2 is a flowchart of an example method for detecting fraud carried out using remote access tools, for example using the system of FIG. 1, according to an embodiment of the teachings herein.

Reference is now made to FIG. 2, which is a flowchart of a method 200 for detecting fraud carried out using remote access tools, for example using the system of FIG. 1, according to an embodiment of the teachings herein.

As depicted in FIG. 2, in block 202, the method 200 includes collecting initial user interaction data during a secure transaction, such as during a banking transaction. In certain implementations, the initial user interaction data may be collected as part of the transaction at the front end of such a transaction. For example, the initial user interaction data may be collected by the data collecting module 150 of FIG. 1 and may include any one or more mouse movements, keystroke dynamics, touchscreen motions or gestures, swipes, clicks, and the like. In certain exemplary implementations, the user interaction data may include event timing data, such as a difference in time ($\Delta t$) between events. Such data may be collected using a user device associated with a user interface used by the specific user during the transaction, such as one of the user interfaces of the user device 102 as shown in FIG. 1.

The collected initial user interaction data may include data relating to touch gestures, such as angle of swipe, acceleration of swipe, the velocity of swipe, time of flight, dominant side, area of swipe, curve fitting, a heat map of swipe, distance of swipe, etc. The collected initial user interaction data may include data relating to keyboard actions, such as a keystroke pattern, a keystroke style, keystroke dwell, keystroke timing, keystroke flight time, etc.

In block 204, the method 200 can include categorizing the collected initial user interaction data. In certain exemplary implementations, the collected initial user interaction data may be categorized, for example, using statistical methods to identify patterns thereof. In certain exemplary implementations, timing distributions, distance metrics, statistical algorithms, clustering algorithms, classification algorithms, etc., may be used to identify and/or categorize the user interaction data.

In block 206, the method 200 can include creating and/or storing a user profile. In accordance with certain implementations, reference data based on the collected initial user interaction data may be created and stored with and/or linked to the user profile. In certain implementations, the user profile and reference data may be stored in a suitable database.

In block 208, the method 200 can include actively perturbing the network. As will be discussed below, during a secure transaction, the use of a remote access protocol may be detected, for example, by comparing reference data to the different responses of the computer (such as the user's computing device 102) used for carrying out the transaction during perturbation. In certain exemplary implementations, the secure transaction may be the same secure transaction as mentioned hereinabove with respect to block 202, or it may be another secure transaction.

In block 210, the user perturbed interaction data may be collected while the network is actively perturbed, for example by increasing the load on the network, increasing the level of packet loss in the network, and/or increasing delays in the network. In some embodiments, the load on the network may be increased, either by increasing the load on the server, such as server 112 or by increasing the load on the user computing device 102. In certain exemplary implementations, the increase in the load may be triggered by or generated by the network controlling module 152, which may run on the server or on the computing device 102 associated with the user. In some embodiments, the increase in the load on the network may be configured so that almost the entirety of the available bandwidth may be occupied, which may cause the system to work under extreme conditions such that indications of remote access tool use may be exposed and detected.

In block 212, the method 200 includes comparing the collected data to the reference data. In accordance with certain exemplary implementations of the disclosed technology, the expected behavior of the user or of the network (as captured by the initial user interaction data and saved as reference data) or associated with a previously generated user profile (e.g., generated at block 206) and/or expected behavior with respect to delays and packet loss in the network may be used in the comparison. The comparison may be carried out, for example, by data comparison module 154 as shown in FIG. 1.

In block 214, the method 200 includes computing a probability that the interactions are generated on the user's device (without a remote access tool). In the alternative, the method 200 may include computing a probability that the interactions are generated and/or influence by a remote access tool. In certain exemplary implementations, computing the probability may be based on the comparison of the user perturbed interaction data to the reference data. In certain exemplary implementations, computing the probability may be based on timing distributions, distance metrics, statistical algorithms, clustering algorithms, and/or classification algorithms.

In block 216, the method 200 includes terminating a transaction if the computed probability (from block 214) is lower than a predefined threshold, indicating that there is a low probability that the interactions are generated on the user's device. Or in the alternative, the transaction may be terminated if it is determined that the interactions are generated and/or influence by a remote access tool.

In accordance with certain exemplary implementations of the disclosed technology, the process of actively perturbing (block 208) can include increasing the load on the network, throttling the network, etc. In certain exemplary implementations, actively perturbing can include increasing the percentage of packet loss in the network. In certain exemplary implementations, actively perturbing can include increasing delays of communications within the network.

In certain exemplary implementations, computing the probability that the interactions are generated on the user's device (block 214) can be based on timing distributions of input data providing input relating to the user interactions. In certain exemplary implementations, computing such probability may be based on a distance or timing ($\Delta t$) between timing samples.

In accordance with certain exemplary implementations of the disclosed technology, actively perturbing may be carried out only when the user is actively interacting with the server.

In certain exemplary implementations, prior to the secure transaction, additional data may be collected relating to user interactions with a user interface associated with the user computing device during standard network conditions. In certain exemplary implementations, such additional data may be used as part of the comparison with reference data (block 212).

In certain exemplary implementations, and prior to the comparing, a data distribution and/or timing pattern may be identified as being consistent with the use of at least one remote access tool. In certain exemplary implementations, the data distribution pattern may be used as part of the comparison with reference data (block 212).

In accordance with certain exemplary implementations of the disclosed technology, the perturbing of the network can include probing a specific port that has previously been identified as being used during the secure transaction.

Examples of deviation from the expected behavior with respect to mouse events are described hereinbelow with respect to FIGS. 3A to 3C. Similar plots can be generated with respect to keyboard events, swipe events, and the like.

Figure 3A:
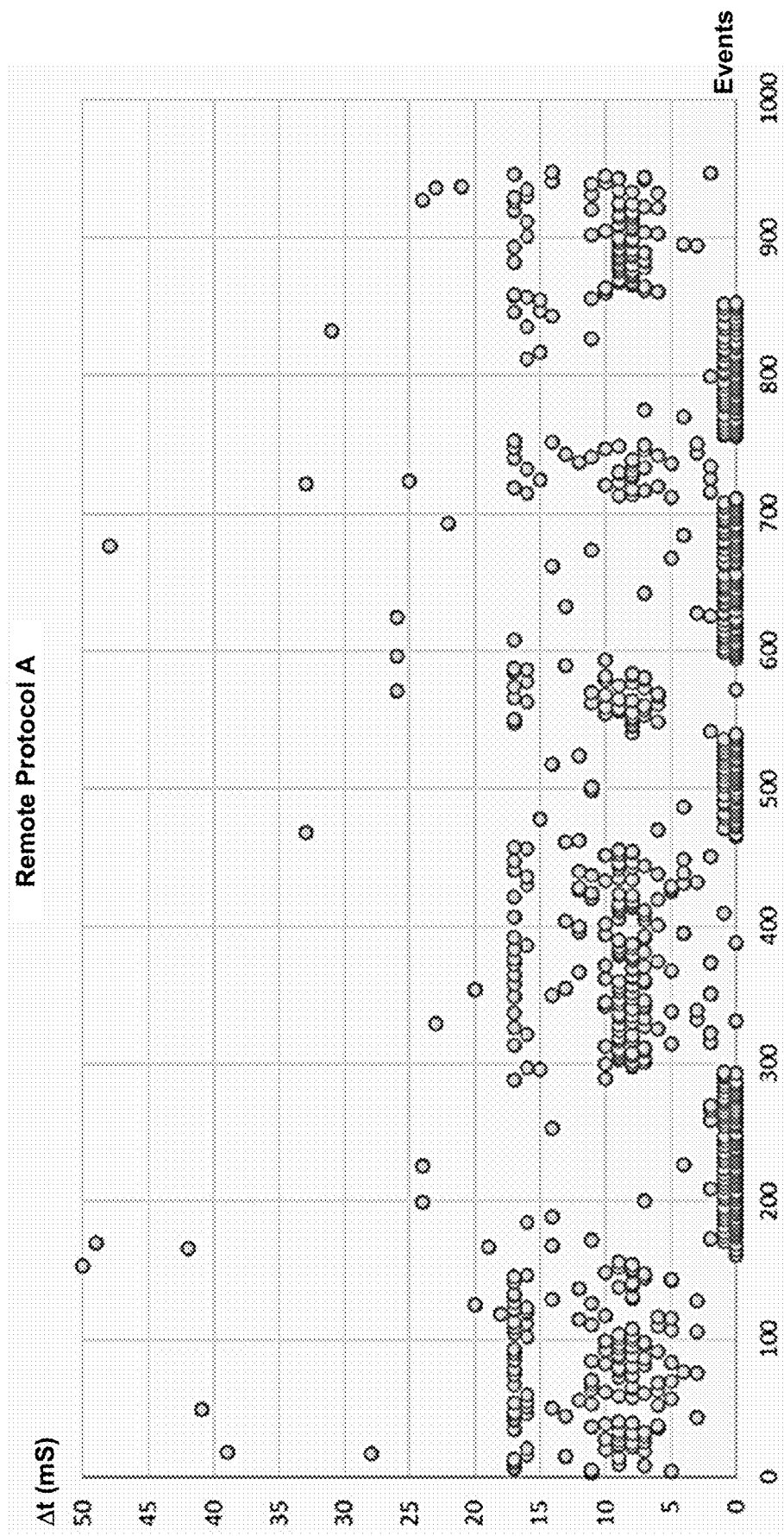
FIG. 3A is an exemplary plot of events (x-axis) and the associated times between events $\Delta t$ (y-axis) which may be utilized for detecting fraud using remote access tools.

FIG. 3A is an example plot of events (x-axis) vs. the associated differences between times of the events received $\Delta t$ (y-axis), which can represent a change in responses over time in a system like that of FIG. 1 when the transaction is carried out by a remote user using the Remote Protocol A tool to carry out the transaction via computing device 102 and the network is throttled. A "protocol" is defined herein as "a set of rules governing the exchange or transmission of data between devices." "Remote" is defined herein as "at a different physical location and not on a local area network." Typically, when using Remote Protocol A and the network has available bandwidth, events are received approximately once per 8 ms. However, as seen in FIG. 3A, when the bandwidth is throttled, the events are received in clustered batches, where multiple events are given the same time stamp, and thus have a $\Delta t$ of 0 or 1 ms. This is the opposite of what one would expect if there were fewer events with larger interspersion therebetween. Additionally, it is clear from FIG. 3A that the induced network impairment results in periods of normal and clustered events. Such changes in event behaviors would be identifiable by the system and can be used as an indicator that the transaction is carried out using a remote access protocol.

Figure 3B:
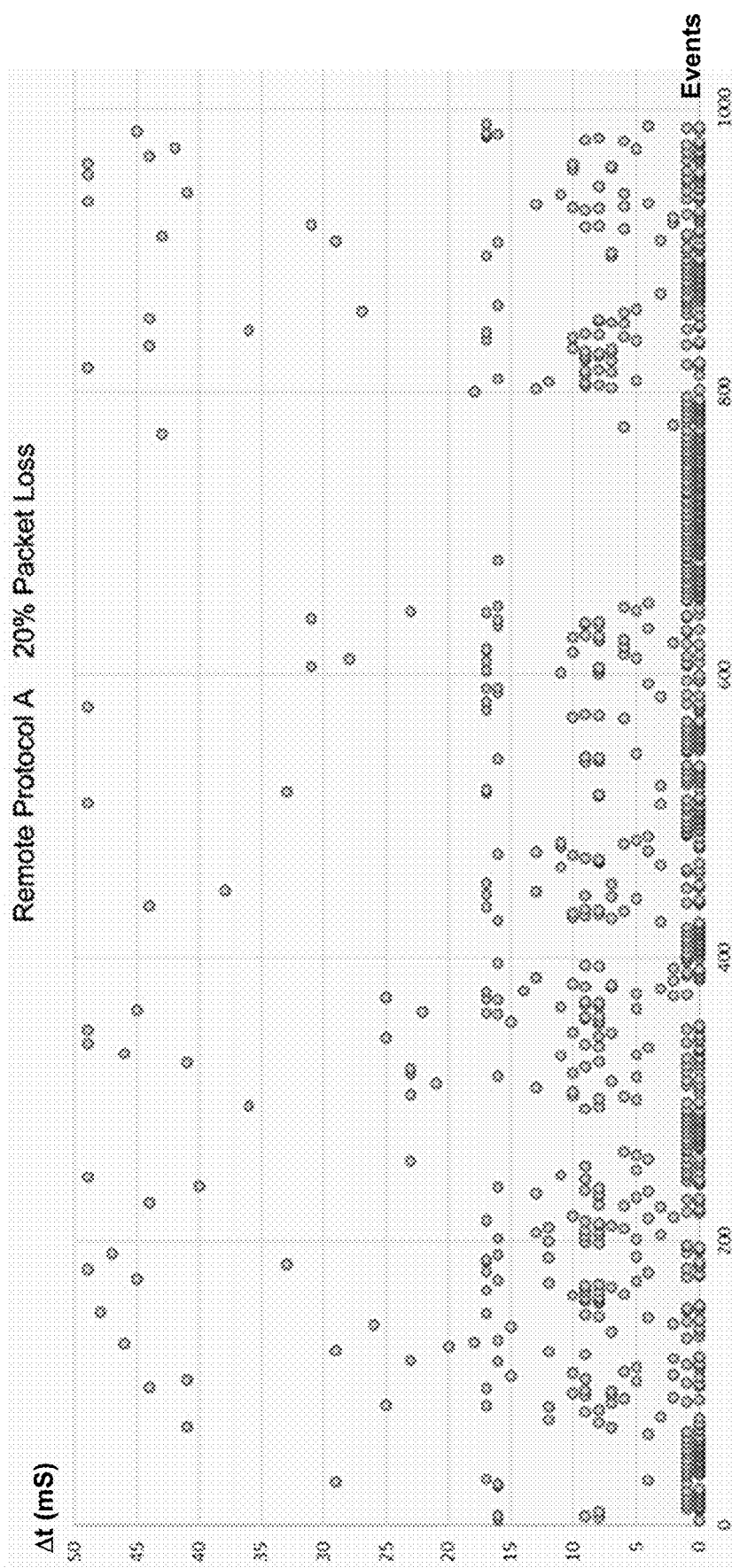
FIG. 3B is another exemplary plot of events (x-axis) and the associated times between events $\Delta t$ (y-axis) which may be utilized for detecting fraud using remote access tools.

FIG. 3B is an example plot of mouse events (x-axis) vs. the associated differences between times of the events received $\Delta t$ (y-axis) when using Remote Protocol A, and forcing a 20% packet loss. As indicated in FIG. 3B, the protocol data is almost entirely (substantially fully) delayed, so that events received become clustered in time (with delays occurring in larger than five or ten received events, in some embodiments of the disclosed technology). Thus, packet loss may be used as a perturbation that may, in turn, indicate the use of a remote access tool (such as Remote Protocol A) during a transaction.

Figure 3C:
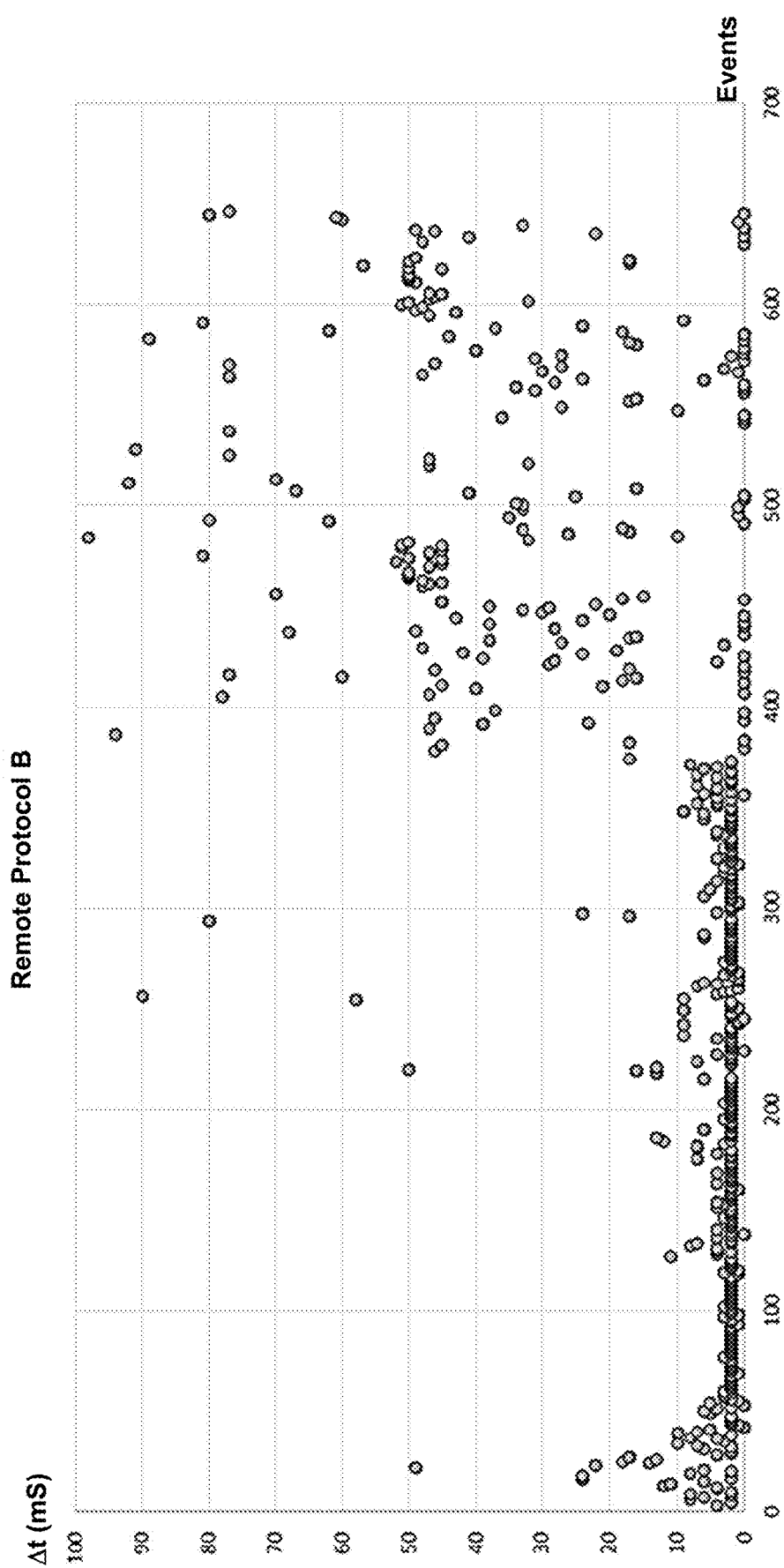
FIG. 3C is another exemplary plot of events (x-axis) and the associated times between events $\Delta t$ (y-axis) which may be utilized for detecting fraud using remote access tools.

FIG. 3C is an example plot of mouse events (x-axis) vs. the associated differences between times of the events received $\Delta t$ (y-axis) when the transaction is carried out by a remote user using a Remote Protocol B tool and the network is throttled (during at least a portion of the sampling). As seen in FIG. 3C, when the bandwidth is throttled (such as during the first ~350 events), mouse events are heavily affected, and the amount of sent mouse events is limited, with events received in clusters, where multiple events are given the same time stamp.

In accordance with certain exemplary implementations of the disclosed technology, timing ($\Delta t$) between events detected during throttling may be compared to such timing between events without throttling to expose the use of a remote access tool in a transaction.

Figure 3D:
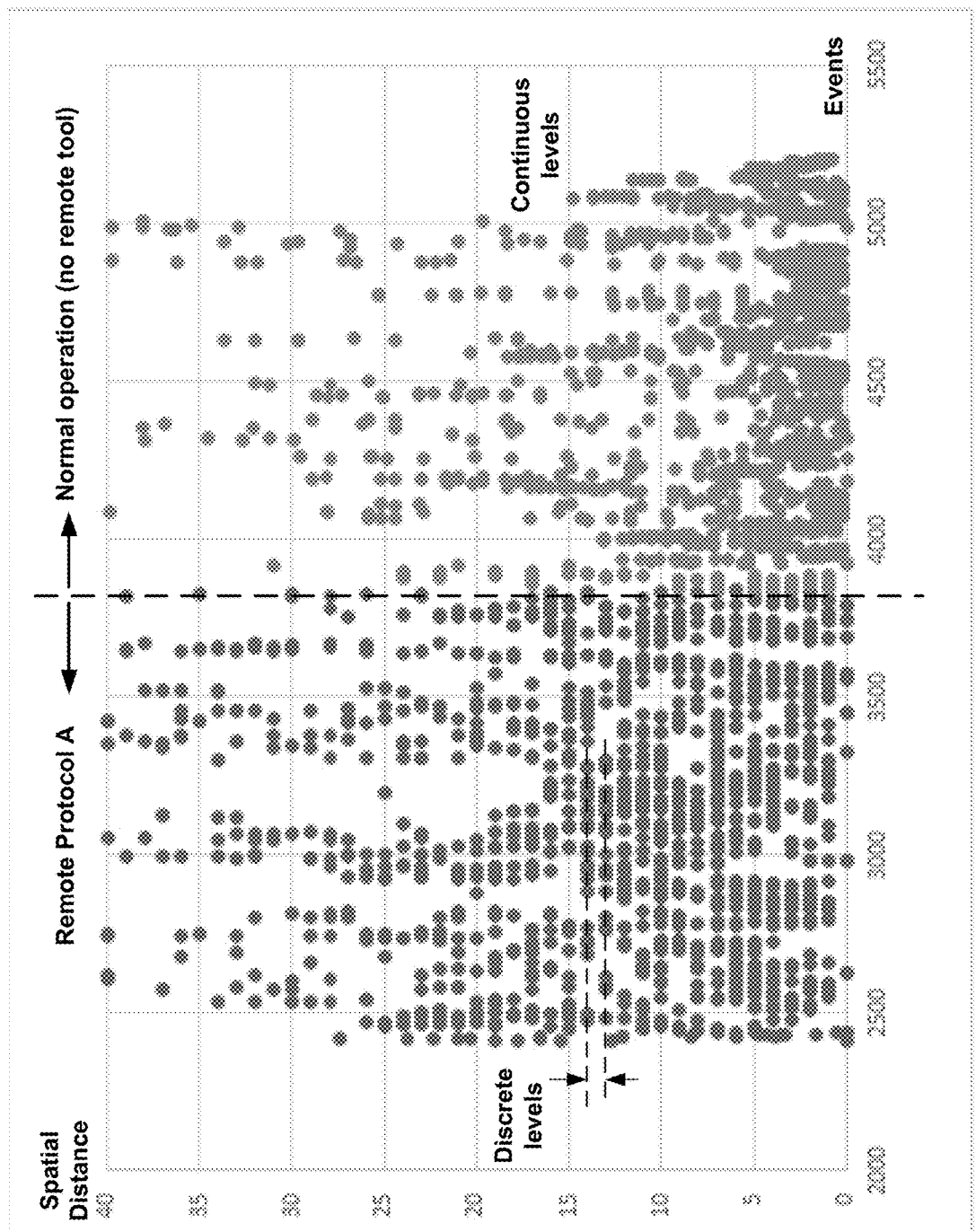
FIG. 3D is an exemplary plot of mouse movement events (x-axis) and the associated spatial distance (y-axis) associated with the mouse movement events when using a remote access tool (left side) and under normal operation (right side).

FIG. 3D is an exemplary plot of mouse movement events (x-axis) and the associated spatial distance (y-axis) associated with the mouse movement events. The samples on the left half of the plot were taken while using a remote access tool (Remote Protocol A). The samples on the right half of the plot were taken and under normal operation (without the use of a remote access tool). As indicated in the left half of the plot, the use of the remote access tool can cause a quantization of (normally continuous) mouse movements such that discrete level groupings of the spatial distance can be detected. In accordance with certain exemplary implementations of the disclosed technology, the discrete level grouping can be a result of compensating (spatial resampling, for example) between different screen resolutions used by the computing device of the remote access tool vs. the user's computing device. On the contrary, when there is no remote access tool involved in the transaction (as depicted in the right half of the plot) the mouse movement spatial distance can appear as continuous. Certain exemplary implementations of the disclosed technology may utilize the detection of discrete levels of spatial distance as an indication that a remote access tool is being utilized.

In accordance with certain exemplary implementations of the disclosed technology, spatial distances associated with certain events (such as mouse events) may be detected during throttling and may be compared to events without throttling to expose the use of a remote access tool in a transaction.

As illustrated in FIGS. 3A-3D, various perturbations can yield different behaviors in event timing and/or distance for different remote access tools, and such behaviors may be distinguishable over the normal operation (without the use of a remote access tool). In accordance with certain exemplary implementations of the disclosed technology, various analysis tools may be utilized to help distinguish between data behavior under normal operation and with the use of a remote access tool.

The analysis tools and techniques utilized here can include but are not limited to clustering algorithms, for example, as discussed in Xu, D., Tian, Y. "A Comprehensive Survey of Clustering Algorithms. Ann. Data. Sci. 2, 165-193 (2015), the contents of which are incorporated herein by reference as if presented in full.

Clustering analysis, for example, may be utilized to determine similarity, dissimilarity, and/or proximity, according to certain standards or rules. Certain implementations may utilize supervised classification to map input data (for example, Δt or spatial distance) to a finite set of discrete class labels (such as discrete timing clusters or discrete levels). Certain exemplary implementations of the disclosed technology may utilize unsupervised classification or exploratory data analysis, for example, to determine natural or "hidden" data structures rather than relying on predefined classifications. In accordance with certain exemplary implementations of the disclosed technology, clustering algorithms may be utilized to partition the user interaction data into a certain number of clusters (groups, subsets, or categories) that may provide indications of whether or not a remote access tool is being used in a transaction.

The analysis tools and techniques utilized herein can include, but are not limited to classification algorithms, for example, as discussed in Mishra et al, Syscom-2021, "A Survey on Data mining classification approaches." (2021), the contents of which are incorporated herein by reference as if presented in full.

Various classification processes may be utilized herein to assign one or more user interaction data events to a predefined class in a group. Certain implementations may employ classification when the user interaction data has already been divided into groups, such as perturbed and non-perturbed. Certain implementations may utilize preprocessing of the user interaction data, which can include data cleaning (missing values, null values, blank values), data integration from multiple sources, data transformation, and/or discretization. Certain implementations of the disclosed technology may utilize classification algorithms including but not limited to decision tree algorithms, naïve Bayes algorithms, rule-based classification, optimal hyperplane algorithms, and genetic algorithms.

The analysis tools and techniques utilized herein can include distance distribution analysis, for example, as discussed in Yang, Liu "Distance Metric Learning: A Comprehensive Survey," (2006), the contents of which are incorporated herein by reference as if presented in full.

Certain distance metric learning algorithms may be utilized and/or combined with other analysis techniques (such as K-nearest-neighbor (KNN)). Certain exemplary implementations of the disclosed technology may utilize supervised distance metric learning. Certain exemplary implementations of the disclosed technology may utilize unsupervised distance metric learning. Certain exemplary implementations of the disclosed technology may utilize various forms of global and/or local distance metric learning, such as linear discriminative analysis, adaptive feature relevance analysis, adaptive kernel metric nearest neighbor classification, etc.

Returning now to FIG. 2, in block 214, the method 200 can include computing a probability that the interactions are generated on the user's computing device 102, which may be based on the results of the comparison. In some embodiments, the probability may be determined based on templates of the absolute values of timing distributions of input data, such as the user interaction data. In some such embodiments, the probability may be based on an evaluation of whether the input data distribution matches another distribution known to stem from one or more remote access tools. In some embodiments, the probability (that the interactions are being generated on the user's computing device 102 without a remote access tool) may be determined based on the distance between timing samples after the network load (or other perturbation) is introduced. In certain exemplary implementations, a comparison of timing samples (with and without network perturbation) may be utilized to determine if a remote access tool is involved.

In some embodiments, if the probability computed at block 214 is below a predefined threshold, such that the transaction is assumed to be carried out using a remote access tool, the transaction may be terminated at block 216.

Alternately, the computed probability may indicate how likely it is that the transaction was carried out via a remote access tool. In such embodiments, at block 216 the transaction may be terminated if the computed probability is above a predefined threshold.

In some embodiments, at block 208, rather than overloading the network as part of the perturbation, the method 200 may identify a protocol used for carrying out the secure interaction and a specific port used for implementing that protocol. The server or user device may connect locally to the specific port used by the protocol and may overload that specific port, for example in an attempt to cause that port to disconnect.

The usage of the previously described remote access tool(s) may be near-real-time service(s) over TCP/IP (transport control protocol/internet protocol). Such tools may be sensitive to slow, congested, or in other ways degraded network conditions. If the network load increases, the continuous sending of interaction data at some point becomes impaired as data packets need to be prioritized, scheduled, and transmitted in competition with another payload. Thus, packets carrying interaction data, in embodiments of the disclosed technology, may be displaced or delayed from their normal time slots, which can introduce delays that are detectable by the systems and/or devices disclosed herein. If packet loss is experienced, packets carrying interaction data risk getting dropped on the transport layer, and the automatic repeat request procedures of the controlling TCP layer may have to re-transmit the packets at a later point, thus also incurring delays and disturbances in the interaction data that may be detectable.

In some embodiments, the actively perturbing and/or overloading of the network may be carried out only during specific times, such as during user interaction with the server, and not during the transmission of data from the server to the user device.

In some embodiments, the network may be actively perturbed in a periodic "on/off" manner, and the resulting user interaction data while actively perturbed (i.e., "on") may be evaluated with respect to periods where the perturbation is "off." Thus, certain implementations of the disclosed technology may be used to detect the use of a remote access tool without having to collect initial user interaction data (block 202 of FIG. 2), without having to categorize the collected initial user interaction data (block 204 of FIG. 2), without storing reference data (block 206 of FIG. 2), and/or without comparison to the reference data (block 212 of FIG. 2).

Figure 4:
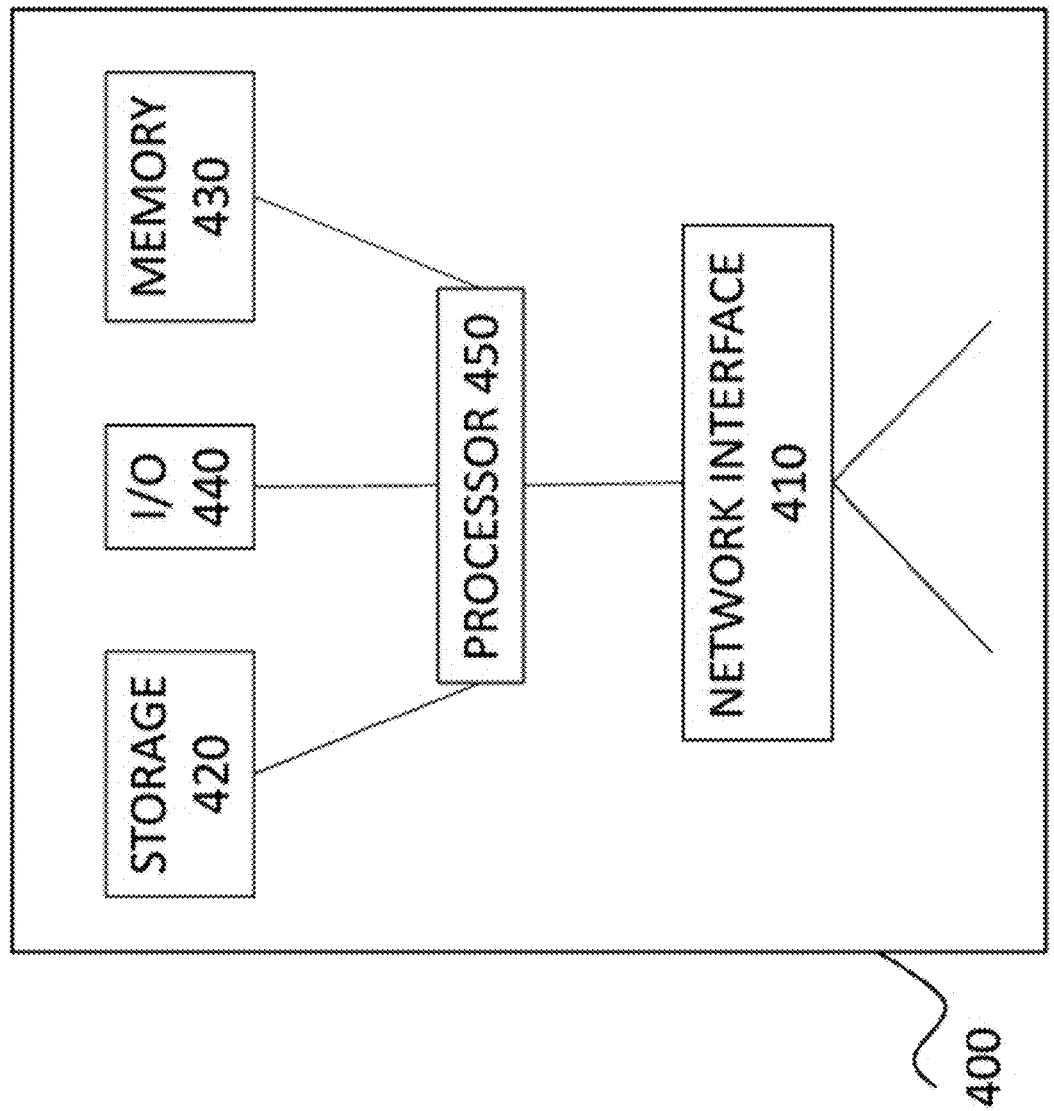
FIG. 4 is a high-level block diagram of devices that may be used to carry out embodiments of the disclosed technology.

FIG. 4 shows a high-level block diagram of a computing device 400 used to carry out embodiments of the disclosed technology, such as the server 112, the user computing device 102, and/or the second computing device 122. In some embodiments, certain modules 150, 152, and/or 154 may also be implemented in the computing device 400, for example, as instructions to be implemented by a processor, stored in a storage device, as explained herein.

In accordance with certain exemplary implementations of the disclosed technology, the device 400 can include a processor 450 that controls the overall operation of the computerized device by executing the device's program instructions which define such operation. The device's program instructions may be stored in a storage device 420 (e.g., magnetic disk, database) and loaded into memory 430 when execution of program instructions is desired. For example, the storage device 420 may store instructions for collecting a set of behavioral data during an online transaction. Thus, the computing device 400 operations may be defined by the program instructions stored in memory 430 and/or storage 420, and the processor 450 may execute the program instructions.

The computing device 400 may also include one or a plurality of input network interfaces for communicating with other devices via a network (e.g., the internet). The computing device 400 may further include an electrical input interface. The computing device 400 may also include one or more output network interfaces 410 for communicating with other devices. For example, the output network interface 410 may facilitate communication between device 400 and the central server.

In certain exemplary implementations, the computing device 400 may also include input/output 440 representing devices that allow for user interaction with a computer (e.g., display, keyboard, mouse, speakers, buttons, etc.). Such input devices may be used when the user interacts with the computerized device during the online transaction, such that the data relating thereto can be collected by the processor.

One skilled in the art will recognize that an implementation of an actual device will contain other components as well and that FIG. 4 is a high-level representation of some of the components of such a device for illustrative purposes. It should also be understood by one skilled in the art that the devices depicted in FIG. 1 and the method depicted in FIG. 2 may be implemented on a device such as is shown in FIG. 4.

It is a particular feature of the disclosed technology that the use of the system of FIG. 1 and the method of FIG. 2 can improve the function of a computerized authentication system, by ensuring that the authenticated party is indeed the one carrying out the transaction, and their device is not being managed remotely by a fraudulent party. This improves the authentication of users and ensures that transactions are more secure.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the disclosed technology.

We claim:

1. A method for determining whether a secure transaction between a user computing device and a server, connected via a network, is controlled remotely from a second computing device via a remote access tool, the method comprising:
   identifying a specific port used for carrying out the secure transaction;
   during the secure transaction, actively perturbing the specific port of the network to change conditions in the network;
   collecting mouse movement spatial data relating to user interactions with a user interface associated with the user computing device during the perturbing of the network;
   determining discrete level groupings of the mouse movement spatial data;
      determining a spatial distance between the determined discreet level groupings of the mouse movement spatial data;
   comparing the data collected during the perturbing of the network to reference data relating to user interactions carried out prior to the secure transaction or prior to perturbing of the network;
   based on the comparing, determining a probability that the secure transaction is carried out via a remote access tool; and
   upon identifying that the probability exceeds a predefined threshold, terminating the secure transaction.

2. The method of claim 1, wherein the actively perturbing comprises increasing a load on the network or throttling the network.

3. The method of claim 1, wherein the actively perturbing comprises increasing a percentage of packet loss in the network.

4. The method of claim 1, wherein the actively perturbing comprises increasing delays of communications within the network.

5. The method of claim 1, wherein the determining the probability is based on timing distributions of input data providing input relating to the user interactions.

6. The method of claim 1, wherein the determining the probability is based on a distance between timing samples.

7. The method of claim 1, wherein the actively perturbing is carried out only when the user is actively interacting with the server.

8. The method of claim 1, further comprising, prior to the secure transaction, collecting additional data relating to user interactions with a user interface associated with the user computing device during standard network conditions, wherein, during the comparing, the additional data is used as part of the reference data.

9. The method of claim 1, further comprising, prior to the comparing, identifying at least one data distribution pattern indicative of a remote access tool, wherein, during the comparing, using the at least one data distribution pattern as part of the reference data.

10. The method of claim 1, wherein the perturbing of the network comprises probing or overloading a specific port identified as being used during the secure transaction.

11. A device for determining whether a secure transaction between a user computing device and a server, connected via a network, is controlled remotely from a second computing device via a remote access tool, the device comprising:
- a storage element, storing reference data relating to events occurring prior to the secure transaction;
- a network interface connected to the network between the user computing device and the server;
- a processor, functionally associated with the storage element, and said network interface, said processor configured for:
  - identifying a specific port used for carrying out the secure transaction;
  - changing conditions in the network during the secure transaction, wherein the changing conditions comprise perturbing the specific port;
  - collecting mouse movement spatial data relating to user interactions with a user interface associated with the user computing device while the conditions of the network are changed;
  - determining discrete level groupings of the mouse movement spatial data;
  - determining a spatial distance between the determined discreet level groupings of the mouse movement spatial data;
  - determining a probability that the secure transaction is carried out via a remote access tool based on the determined spatial distance between the determined discrete level groupings of the mouse movement spatial data; and
  - upon identifying that the probability exceeds a predefined threshold, terminating the secure transaction.

12. The device of claim 11, wherein the processor is configured for changing the conditions in the network by increasing a load on the network or by throttling the network.

13. The device of claim 11, wherein the processor is configured for changing the conditions in the network by increasing a percentage of packet loss in the network.

14. The device of claim 11, wherein the processor is configured for changing the conditions in the network by increasing delays of communications within the network.

15. The device of claim 11, wherein the processor is configured for determining the probability that the secure transaction is carried out via a remote access tool based on timing distributions of input data related to the user interactions.

16. The device of claim 11, wherein the processor is configured for determining the probability that the secure transaction is carried out via a remote access tool based on a distance between timing samples.

17. The device of claim 11, wherein the processor is configured for changing the conditions when the user is actively interacting with the server.

18. The device of claim 11, wherein the processor is further configured for collecting additional data relating to user interactions with a user interface associated with the user computing device during standard network conditions and storing the additional data as part of the reference data.

19. The device of claim 11, wherein the processor is further configured for identifying at least one data distribution pattern related to the use of at least one remote access tool and storing the at least one data distribution pattern as part of the reference data.

20. The device of claim 11, wherein the processor is further configured for changing the conditions of the specific port that was previously identified as being used during the secure transaction.

21. The device of claim 11, wherein the discrete level groupings of the mouse movement spatial data is determined using K-nearest-neighbor (KNN) analysis.

22. The device of claim 11, wherein the mouse movement spatial data is clustered into the discrete level groupings of spatial distance using linear discriminative analysis.

23. The device of claim 11, wherein the mouse movement spatial data is clustered into the discrete level groupings using supervised or unsupervised classification.

24. The device of claim 11, wherein determining a probability that the secure transaction is carried out via a remote access tool comprises determining a difference between the mouse movement spatial data under perturbed and unperturbed conditions of the network.

* * * * *